US012485674B2

(12) United States Patent
Sato

(10) Patent No.: US 12,485,674 B2
(45) Date of Patent: Dec. 2, 2025

(54) LIQUID EJECTION HEAD

(71) Applicant: RISO Technologies Corporation, Tokyo (JP)

(72) Inventor: Tetsuya Sato, Yokohama Kanagawa (JP)

(73) Assignee: RISO Technologies Corporation, Tokyo (JP)

( * ) Notice: Subject to any disclaimer, the term of this patent is extended or adjusted under 35 U.S.C. 154(b) by 104 days.

(21) Appl. No.: 18/525,308

(22) Filed: Nov. 30, 2023

(65) Prior Publication Data

US 2024/0308217 A1 Sep. 19, 2024

(30) Foreign Application Priority Data

Mar. 13, 2023 (JP) ................................ 2023-038816

(51) Int. Cl.
*B41J 2/14* (2006.01)

(52) U.S. Cl.
CPC .... *B41J 2/1433* (2013.01); *B41J 2002/14419* (2013.01); *B41J 2002/14483* (2013.01); *B41J 2202/08* (2013.01); *B41J 2202/12* (2013.01)

(58) Field of Classification Search
CPC ............ B41J 2/1433; B41J 2002/14419; B41J 2002/14483; B41J 2202/08; B41J 2202/12; B41J 2/14209; B41J 2/14201; B41J 29/377
See application file for complete search history.

(56) References Cited

U.S. PATENT DOCUMENTS 8,820,891 B2 9/2014 Bansyo
11,872,812 B2 1/2024 Iijima

FOREIGN PATENT DOCUMENTS

EP 4032709 A1 * 7/2022 ................ B41J 2/17

OTHER PUBLICATIONS

Iijima Tomomi, "Liquid Ejection Head and Liquid Ejection Device" (EP 4 032 709 A1), Jul. 27, 2022, [Paragraphs 0029-0055] (Year: 2022).*
Extended European Search Report dated Jun. 6, 2024, mailed in counterpart European Application No. 24151167.4, 7 pages.

* cited by examiner

*Primary Examiner* — Lisa Solomon
(74) *Attorney, Agent, or Firm* — Kim & Stewart LLP

(57) ABSTRACT

According to one embodiment, a liquid ejection head includes an actuator with pressure chambers, a first common chamber on a first side of the pressure chambers, a second common chamber on a second side of the pressure chambers, and a manifold providing a first liquid flow path above the first common chamber, a first cooling flow path above the second common chamber, and a second liquid flow path above the first cooling flow path. The second liquid flow path is connected to the first liquid flow path by a confluence portion at a confluence position between a first end of the first liquid flow path and a midpoint of the first liquid flow path.

21 Claims, 10 Drawing Sheets

LIQUID EJECTION HEAD

CROSS-REFERENCE TO RELATED APPLICATION

This application is based upon and claims the benefit of priority from Japanese Patent Application No. 2023-038816, filed on Mar. 13, 2023, the entire contents of which are incorporated herein by reference.

FIELD

Embodiments described herein relate generally to a liquid ejection head.

BACKGROUND

In recent years, there is the increasing demand for high-speed printing for higher productivity in inkjet printers, and it is thus preferable for liquid ejection heads to operate at high ejection frequency. For this reason, there is a tendency for heating associated with driving the actuator to increase especially near the ejection portion. Therefore, a technique to improve the cooling performance by providing a cooling flow path near the heat generating units has been proposed. However, if the cooling-related structure becomes complicated and large in a liquid ejection head, problems associated with increase in head size and increased manufacturing costs may occur.

In addition, in a liquid ejection head in which the ink supply path is provided along a fixed direction, the ink will carry heat from the ink supply side towards the ink discharge side, the temperature will of the ink will thus differ depending on distance from an ink supply point or the like. Such a temperature variation can cause deterioration in printing performance.

DETAILED DESCRIPTION

The present disclosure describes a liquid ejection head having improved cooling performance.

According to one embodiment, a liquid ejection head includes a nozzle plate including a plurality of nozzles arranged in a row along a first direction; an actuator including a plurality of pressure chambers, each pressure chamber being associated with a respective nozzle of the nozzle plate, the pressure chambers extending lengthwise in a second direction intersecting the first direction; a first common chamber on a first side of the plurality of pressure chambers and extending lengthwise along the first direction; a second common chamber on a second side of the plurality of pressure chambers and extending lengthwise along the first direction, the plurality of pressure chambers being between the first and second common chambers in the second direction; and a manifold on a surface of the actuator. The manifold forms a first liquid flow path above the first common chamber in a third direction and extending lengthwise along the first direction, a first cooling flow path above the second common chamber in the third direction and extending lengthwise along the first direction, and a second liquid flow path above the first cooling flow path in the third direction and extending lengthwise in the first direction. The second liquid flow path is connected to the first liquid flow path by a confluence portion at a confluence position between a first end of the first liquid flow path in the first direction and a midpoint of the of the first liquid flow path along the first direction.

Figure 1:
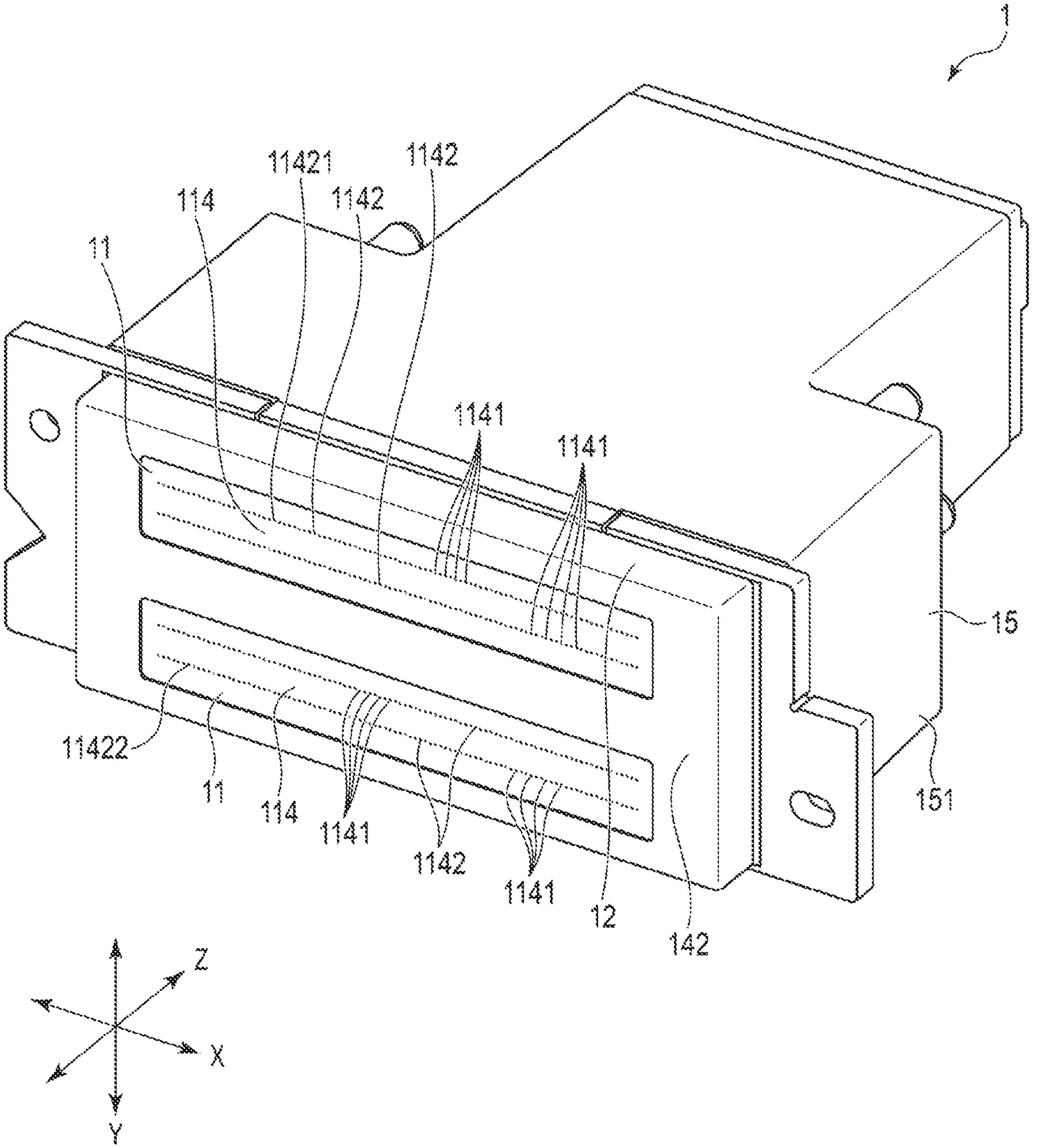
FIG. 1 is a perspective view of a liquid ejection head according to a first embodiment.
Figure 2:
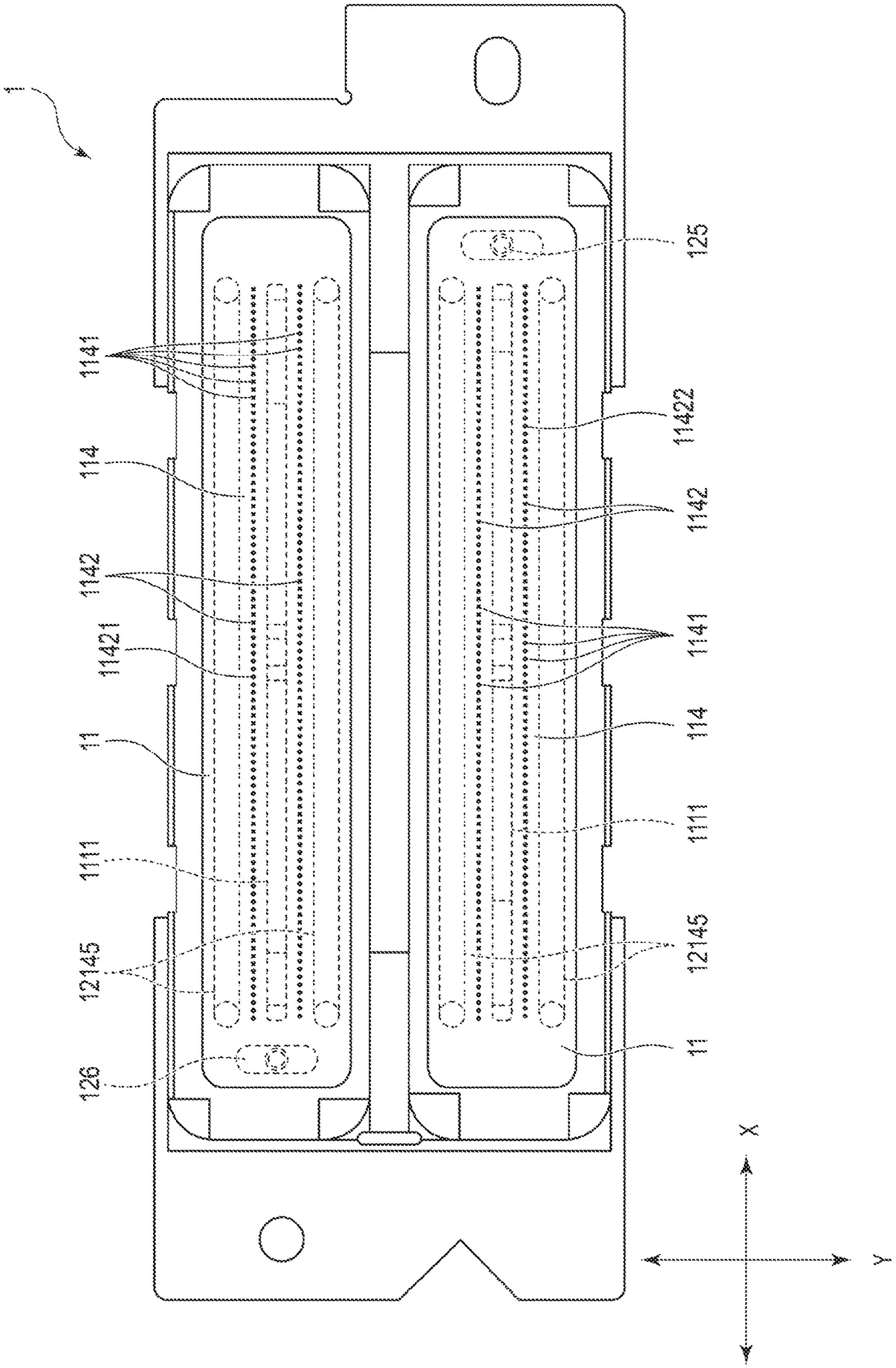
FIG. 2 is a bottom view illustrating the configuration of a liquid ejection head according to a first embodiment.
Figure 3:
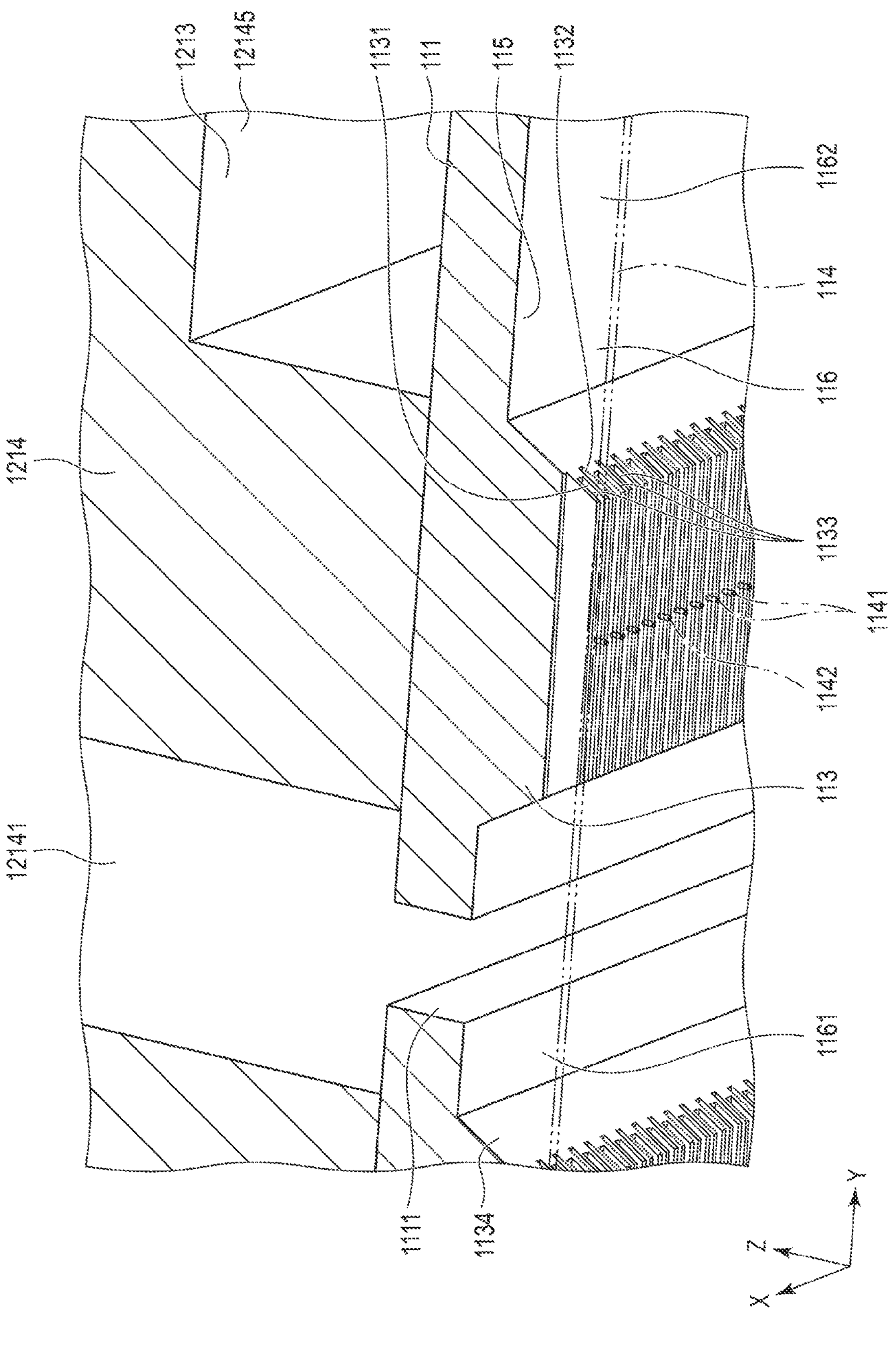
FIG. 3 is a partial cross section of a head body according to a first embodiment.
Figure 4:
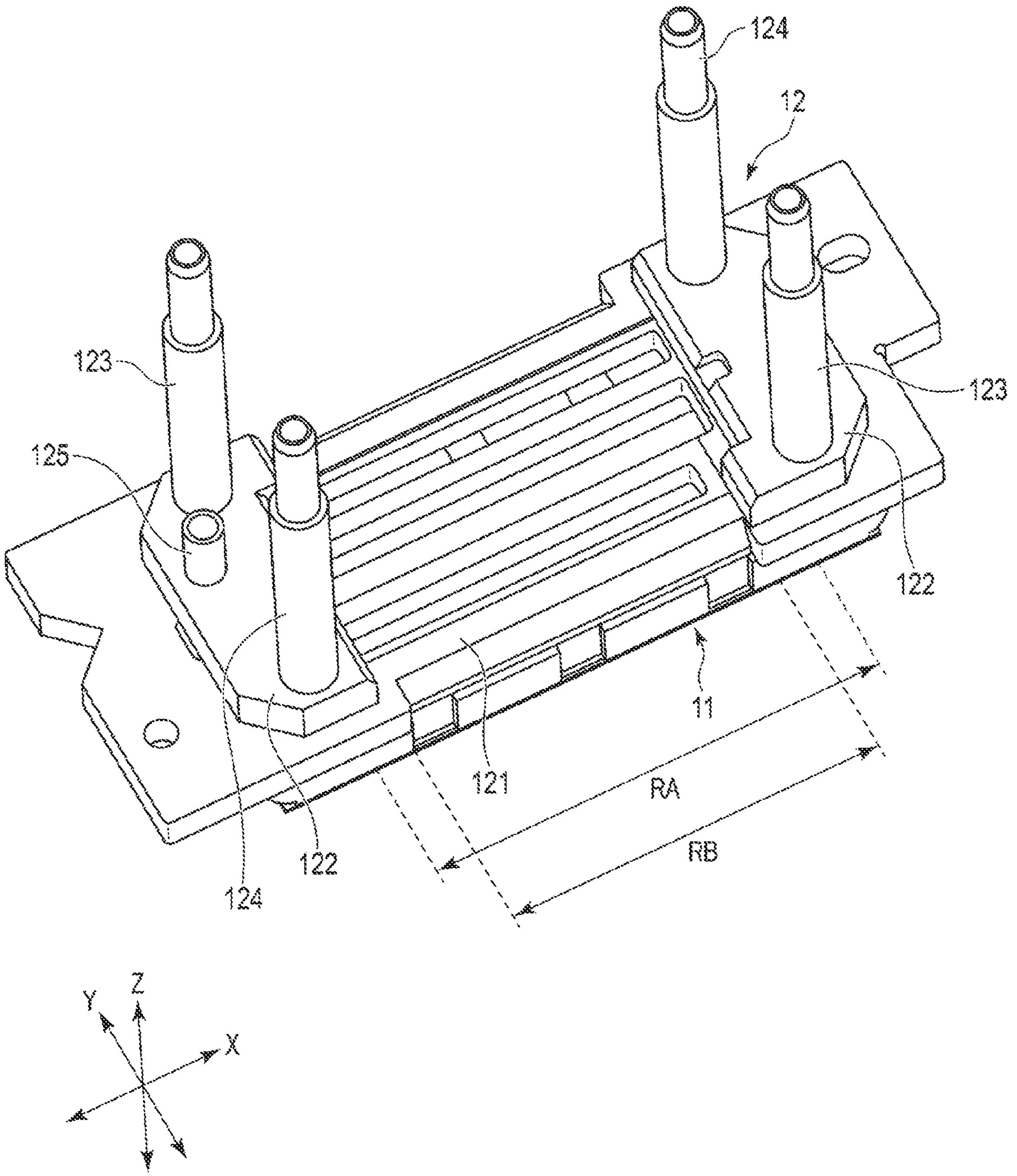
FIG. 4 is a perspective view of a manifold unit according to a first embodiment.
Figure 5:
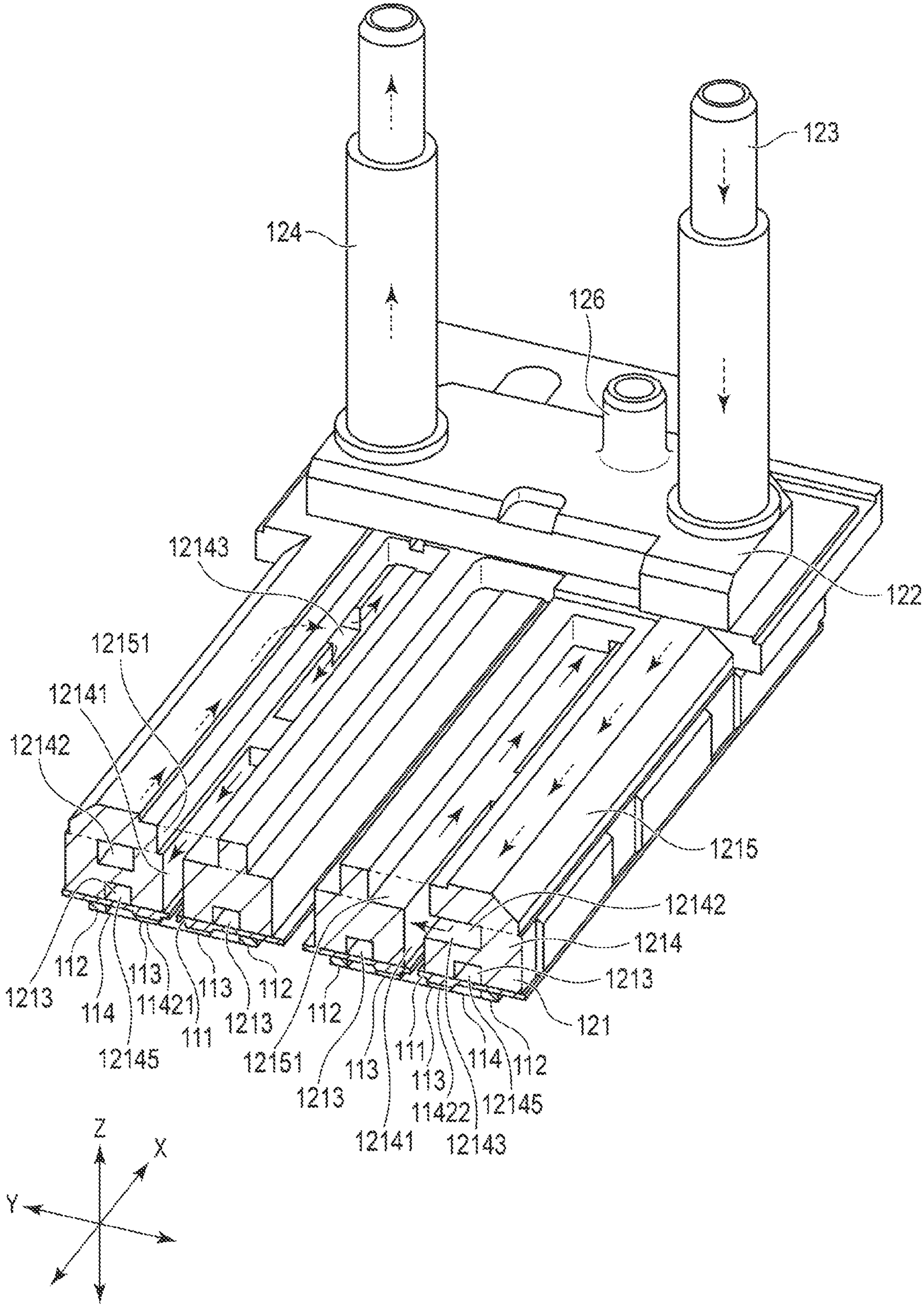
FIG. 5 is a perspective view illustrating a partial cross section of a manifold unit according to a first embodiment.
Figure 6:
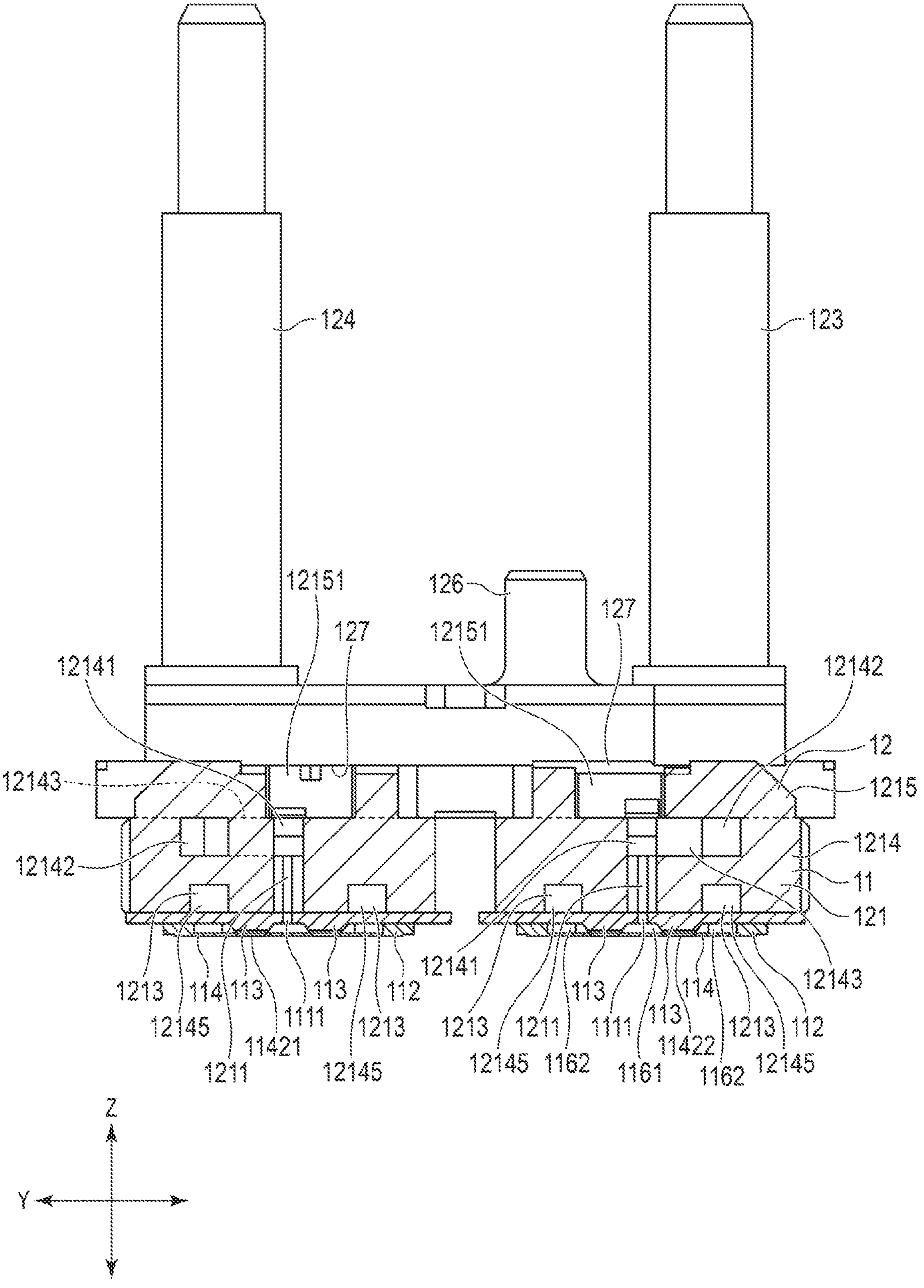
FIG. 6 is a cross-sectional view of a manifold unit according to a first embodiment.
Figure 7:
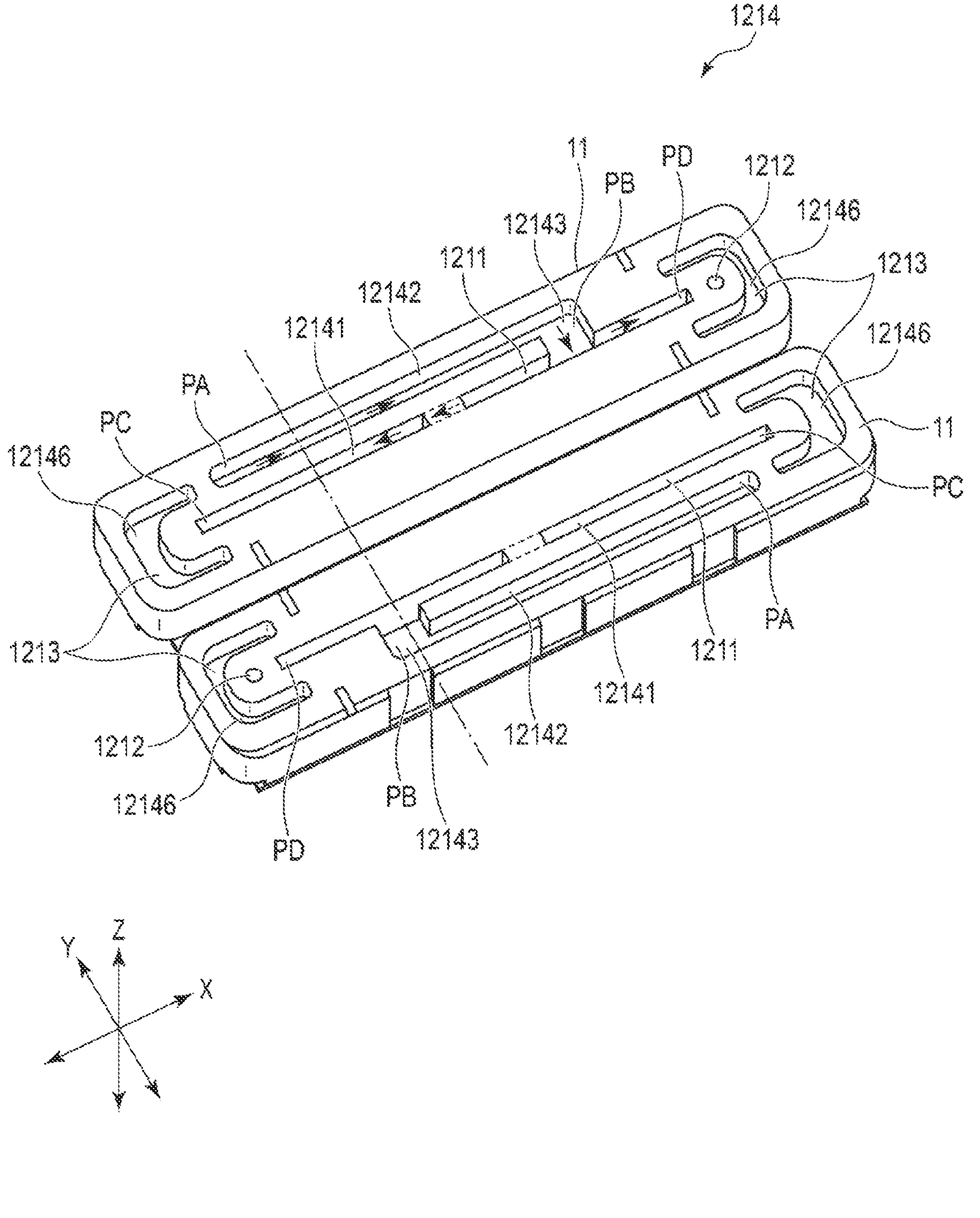
FIG. 7 depicts a first manifold of a manifold unit according to a first embodiment.
Figure 8:
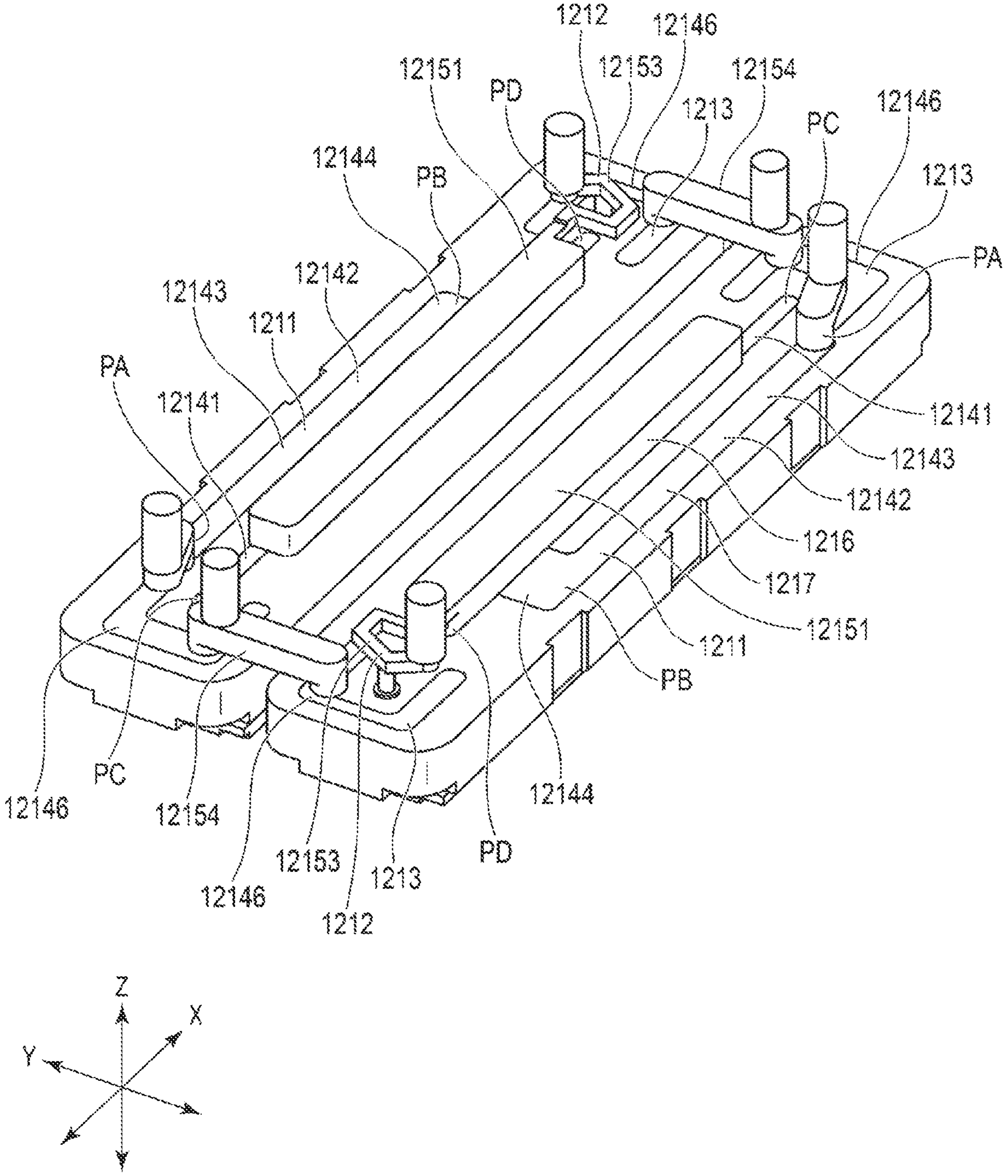
FIG. 8 depicts aspects of a flow path in a manifold unit according to a first embodiment.
Figure 9:
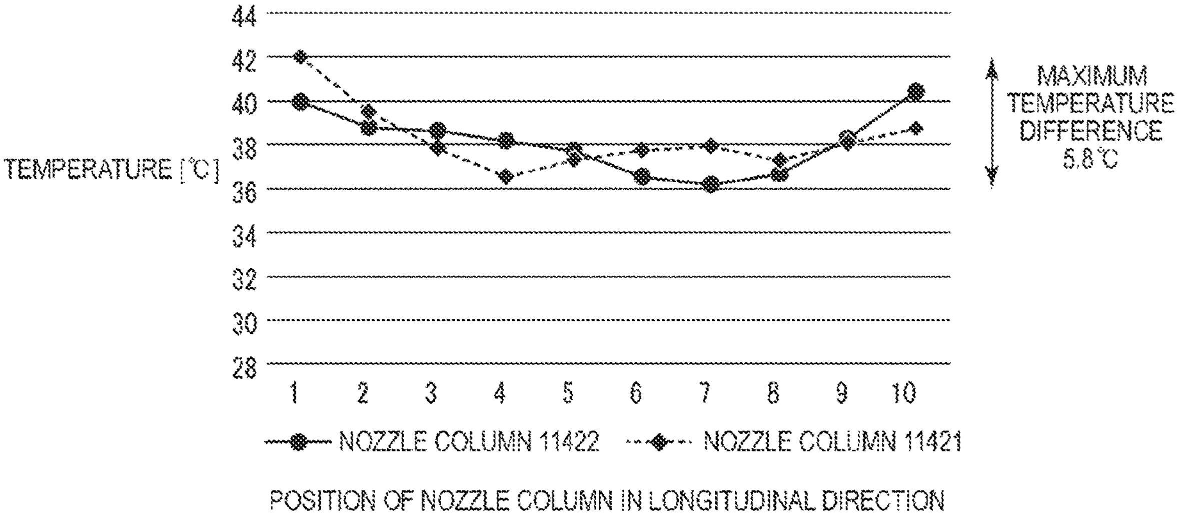
FIG. 9 is a graph illustrating a temperature distribution in a liquid ejection head according to a first embodiment.
Figure 10:
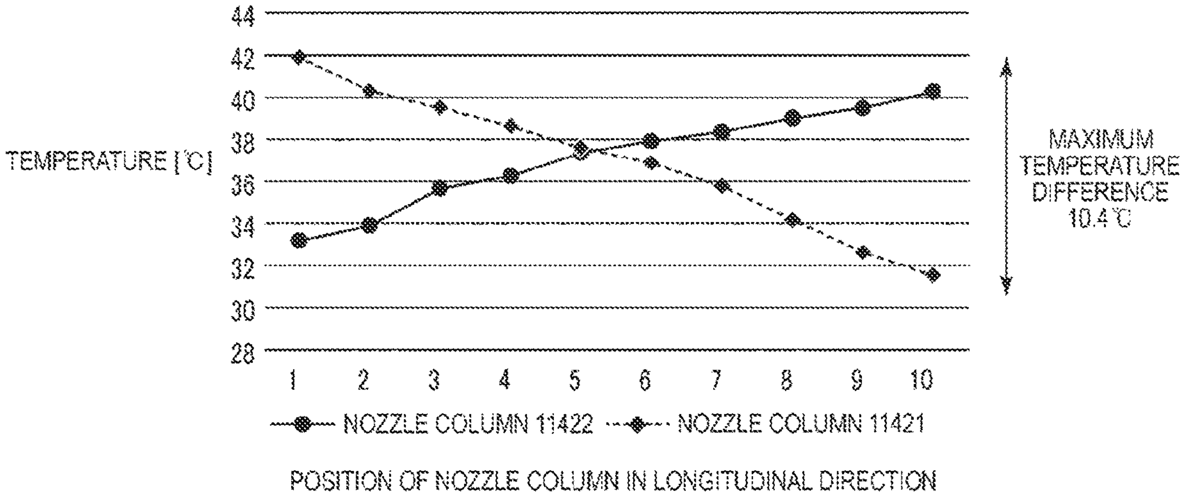
FIG. 10 is a graph illustrating a temperature distribution in a liquid ejection head according to a comparative example.
Figure 11:
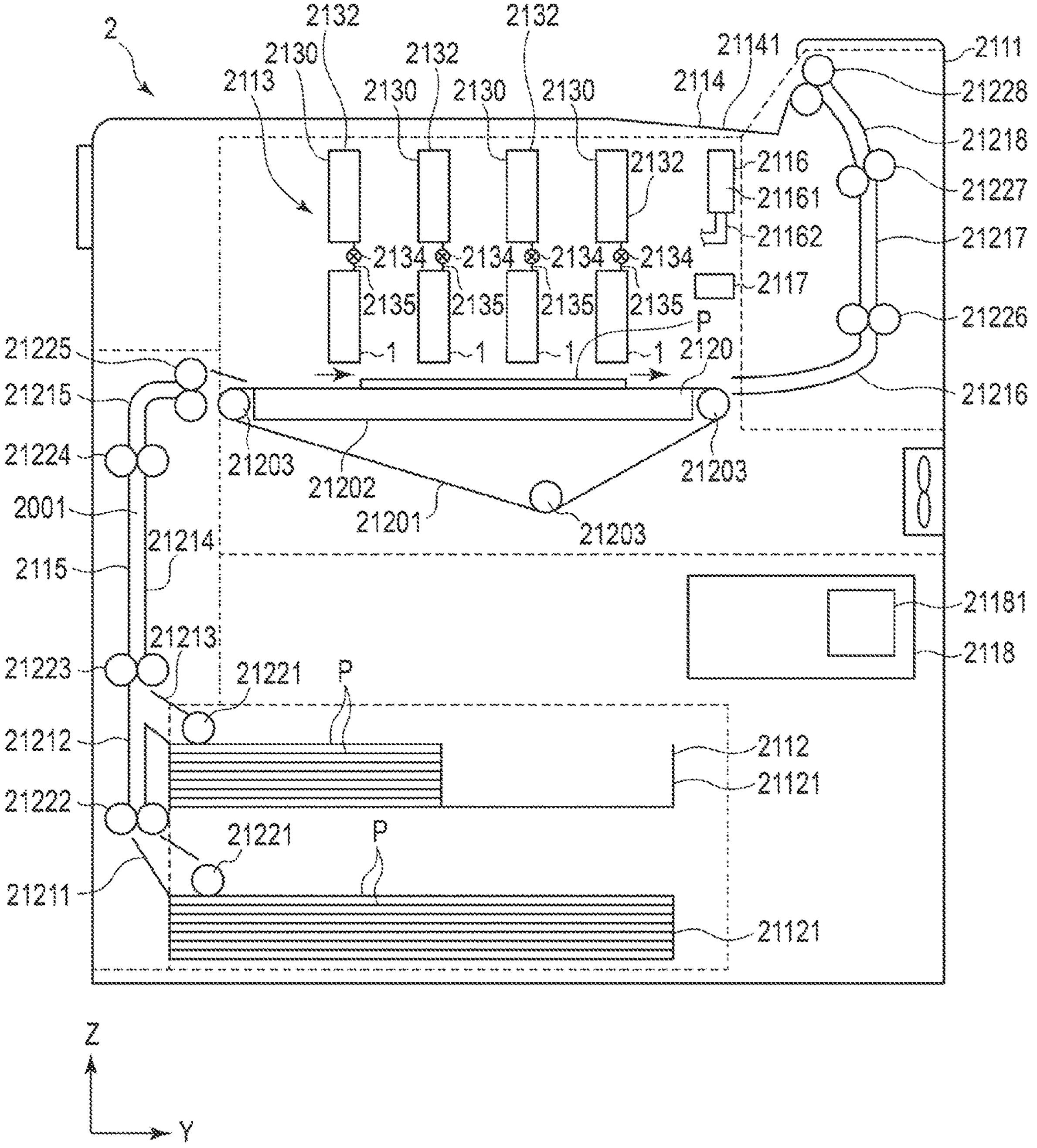
FIG. 11 depicts a liquid ejection device according to an embodiment.

Hereinafter, a liquid ejection head 1 and a liquid ejection device 2 using a liquid ejection head 1 according to a first embodiment will be described with reference to FIGS. 1 to 11. FIG. 1 is a perspective view illustrating a configuration of the liquid ejection head 1 according to the first embodiment. FIG. 2 is a bottom view illustrating the configuration of the liquid ejection head 1. FIG. 3 is a perspective view illustrating a configuration of a head body on a partial cross section. FIG. 4 is a perspective view illustrating a configuration of a manifold unit 12. FIG. 5 is a perspective view illustrating a partially cut-away cross section of the manifold unit 12. FIG. 6 is a cross-sectional view. FIG. 5 is a perspective view illustrating a configuration of a manifold for the liquid ejection head 1. FIG. 6 depicts ink flow paths. FIG. 7 is a perspective view of a first manifold 1214. FIG. 8 depicts aspects of the first manifold 1214 and a supply path 1211. FIG. 9 is a graph illustrating a temperature distribution in the liquid ejection head 1. FIG. 10 is a graph illustrating a temperature distribution of a liquid ejection head according to a comparative example (Comparative Example). FIG. 11 depicts aspects of a liquid ejection device 2. It is noted that, in each figure, for the purposes of improved description, configurations may be illustrated as enlarged, reduced in size, or omitted as appropriate.

The liquid ejection head 1 is, for example, a shear mode inkjet head used in the liquid ejection device 2, which may be an inkjet recording device such as illustrated in FIG. 11. The liquid ejection head 1 has, for example, an independent drive structure in which pressure chambers 1131 and air chambers 1132 are alternately provided with one another. The liquid ejection head 1 is provided in a head unit 2130 including a supply tank 2132 as a liquid containing unit provided in the liquid ejection device 2.

The liquid ejection head 1 is supplied with ink from the supply tank 2132. It is noted that the liquid ejection head 1 may be a non-circulating type head that does not circulate ink therethrough or may be a circulating head that circulates ink therethrough. In the present example, the liquid ejection head 1 is a non-circulating head. The liquid ejection head 1 is connected to a cooling device 2116 provided in the liquid ejection device 2. The cooling device provides a cooling liquid (e.g., cooling water) for controlling temperature of liquid ejection head 1 and the ink. The liquid ejection head 1 together with the cooling device 2116 may be referred to as a water circulation cooling structure.

As illustrated in FIGS. 1 to 8, the liquid ejection head 1 includes a head body 11, a manifold unit 12, and a cover 15. For example, the liquid ejection head 1 is a side shooter type four-row integral structure head having two sets of head bodies 11 each including a pair of actuators 113.

The head body 11 ejects a liquid (e.g., ink). The head body 11 includes a board 111, a frame 112, an actuator 113 (having a plurality of pressure chambers 1131 and a plurality of air chambers 1132), and a nozzle plate 114.

The head body 11 has a common liquid chamber 116 communicating with the plurality of pressure chambers 1131 of the actuator 113. The primary (inflow) side of the plurality of pressure chambers 1131 is also referred to as an upstream side of the plurality of pressure chambers 1131 in the liquid flowing direction. The secondary (outflow) side of the plurality of pressure chambers 1131 is also referred to as a downstream side of the plurality of pressure chambers 1131 in the liquid flowing direction.

The head body 11 has an electrode portion configured with an electrode film formed on the board 111 and the actuator 113. Specifically, the head body 11 includes, as electrode units, a plurality of individual electrodes that respectively drive the plurality of pressure chambers 1131 of the actuator 113 and one or a plurality of common electrodes that simultaneously drive the plurality of pressure chambers 1131.

In the present embodiment the head body 11 has the two actuators 113, and the common liquid chamber 116 has one first common liquid chamber 1161 and two second common liquid chambers 1162. The common liquid chamber 116 includes a first common liquid chamber 1161 communicating with primary side openings (inlets) of the pressure chambers 1131 and a second common liquid chamber 1162 communicating with secondary side openings (outlets) of the pressure chambers 1131.

The board 111 is formed in a rectangular plate shape of a ceramic material such as alumina. The board 111 is formed, for example, in a rectangular shape elongated in one direction (X direction). The electrode film is formed on the front surface 115 which is one main surface of the board 111. The front surface is a polished surface. The pair of actuators 113 are provided on the front surface 115 of the board 111 so as to be aligned in a lateral direction (Y direction) of the board 111. The board 111 has a single supply port 1111, which is the opening through which liquid passes. The supply port 1111 is a through hole penetrating between both main surfaces of the board 111.

A back surface of the board 111 faces a manifold 121 and covers grooves (forming a first cooling flow path 1213) formed on the facing surface of the manifold 121 and through which the cooling water flows. That is, the board 111 together with the manifold 121 forms the first cooling flow path 1213.

The supply port 1111 is an inlet for supplying ink to the first common liquid chamber 1161. The supply port 1111 is a through hole formed in the center of the board 111 in the lateral direction. The supply port 1111 extends along the longitudinal direction of the board 111. In other words, the supply port 1111 is, for example, an elongated hole which is elongated in one direction along the longitudinal direction of the actuator 113 and the longitudinal direction of the first common liquid chamber 1161. The supply port 1111 is provided between the pair of actuators 113 and opens at the position facing the first common liquid chamber 1161.

A portion of a common electrode 119 is formed on the inner wall surface of the supply port 1111.

The actuator 113 and the frame 112 are provided on the board 111. The inside of the frame 112 of the board 111 is a wetted area where ink is disposed (flows), and the outside of the frame 112 is a mounting area to which various electronic components can be connected.

The frame 112 is fixed to one main surface of the board 111 with the adhesive or the like. The frame 112 surrounds the supply port 1111 provided on the board 111 and the actuator 113.

The frame 112 is formed in a rectangular frame shape. The frame 112 may have a stepped structure in which a portion of the front surface is recessed. The pair of actuators 113 and the supply port 1111 are arranged within the opening of the frame 112. The frame 112 surrounds the actuators 113 and is between the nozzle plate 114 and the board 111 and is capable of holding a liquid inside region surrounded by the frame 112.

The pair of actuators 113 are adhered to the front surface 115 of the board 111. The actuators 113 are aligned in two columns on the board 111 with the supply port 1111 interposed therebetween. Each actuator 113 is formed in the plate shape elongated in one direction. The actuators 113 are surrounded by the frame 112 and adhered to the front surface 115 of the board 111.

Each actuator 113 has a plurality of pressure chambers 1131 arranged at equal intervals in the longitudinal direction with an air chamber 1132 arranged between the adjacent pressure chambers 1131. In other words, the pressure chambers 1131 and air chambers 1132 are alternately arranged along the longitudinal direction of the actuator 113. The pressure chambers 1131 and the air chambers 1132 extend lengthwise in a direction intersecting the alignment direction. This direction may be referred to as a lateral direction or width direction of the actuator 113.

A top surface of the actuator 113 is adhered to the nozzle plate 114. A plurality of grooves are formed along the direction perpendicular to the longitudinal direction of the actuator 113. The plurality of grooves form the plurality of pressure chambers 1131 and the plurality of air chambers 1132. In other words, the actuator 113 has a plurality of piezoelectric bodies 1133, which are driving elements, forming sidewalls of the grooves. The plurality of piezoelectric bodies 1133 form sidewalls of the plurality of pressure chambers 1131 and the plurality of air chambers 1132, and the volume of the pressure chambers 1131 is changed by applying a driving voltage to the piezoelectric bodies 1133.

In this example, the width of the actuator 113 gradually increases from the top toward the board 111. The cross-sectional shape of the cross section of the actuator 113 is formed in a trapezoidal shape. That is, the actuator 113 has inclined surfaces 1134. The side surface portions (inclined surfaces 1134) are arranged to face the first common liquid chamber 1161 and the second common liquid chamber 1162. The electrode film is formed in a predetermined pattern on the inclined surface 1134.

As a specific example, the actuator 113 is formed of a laminated piezoelectric member in which two rectangular plate-shaped piezoelectric materials are adhered so that the polarization directions are opposite to each other. Herein, the piezoelectric material is, for example, PZT (lead zirconate titanate). The actuator 113 is adhered to the front surface 115 of the board 111 by, for example, a thermosetting epoxy adhesive. The inclined surface 1134 is formed by, for example, cutting or the like of the piezoelectric material. The front surface 115 of the board 111 and the actuator 113 is a polished surface formed in, for example, a polishing process. In the actuator 113, a plurality of grooves forming the plurality of pressure chambers 1131 and the plurality of air chambers 1132 is formed in a cutting process. The piezoelectric body (driving element) 1133 forming the side walls separating adjacent grooves is formed in the cutting process.

In addition, electrode films forming individual electrodes and common (shared) electrodes are formed in a pattern on the actuator 113.

When the liquid ejection head 1 performs operations such as printing, the pressure chambers 1131 are deformed, so that ink is ejected from nozzles 1141. The pressure chamber 1131 has an inlet opening to the first common liquid chamber 1161 and an outlet opening to the second common liquid chamber 1162. For the pressure chamber 1131, ink flows from the inlet, and ink flows out from the outlet. It is noted that the pressure chamber 1131 in other examples may have a configuration in which ink flows in from both openings (ends) described above as the inlet and the outlet. Individual electrodes for pressure chambers 1131 are formed inside the grooves constituting the pressure chambers 1131.

The air chamber 1132 is separated from the first common liquid chamber 1161 and the second common liquid chamber 1162 by the blocking of the inlet side and the outlet side with a liquid-proof wall formed of a photosensitive resin or the like. The liquid-proof wall of the air chamber 1132 may be formed by pouring an ultraviolet curable resin over the electrodes in the grooves forming the air chamber 1132, and, after that, selectively irradiating regions at both ends of the groove with ultraviolet rays through an exposure mask or the like. Such a liquid-proof wall formed at the ends of certain grooves prevents ink from entering the now-formed air chambers 1132. The upper side of air chamber 1132 is covered (blocked) by the nozzle plate 114, and a nozzle 1141 is not arranged therewith. Therefore, ink does not flow or enter into the air chamber 1132.

The nozzle plate 114 is a plate shape. The nozzle plate 114 is fixed to the frame 112 with the adhesive or the like. The nozzle plate 114 has a plurality of nozzles 1141 formed at positions to be respectively facing the plurality of pressure chambers 1131. In the present embodiment, the nozzle plate 114 has two nozzle columns 1142 in each of which nozzles 1141 are aligned along one direction.

A first common liquid chamber 1161 is formed between a pair of actuators 113 but excluding both ends and forms the flow path of the ink from the supply port 1111 to the primary side opening (inlet) of the pressure chambers 1131 of each actuator 113 in the pair. The first common liquid chamber 1161 extends along the longitudinal direction of the actuators 113. The first common liquid chamber 1161 constitutes a portion of the flow path of the ink.

The second common liquid chamber 1162 is formed between on the opposite side of each actuator 113 from the first common liquid chamber 1161. The second common liquid chamber 1162 is between an actuator and the frame 112. The second common liquid chamber 1162 forms the flow path of the ink from the secondary side opening (outlet) of the plurality of pressure chambers 1131. The second common liquid chamber 1162 extends along the longitudinal direction of the actuators 113. The second common liquid chamber 1162 constitutes a portion of the flow path of the ink.

The individual electrodes are configured to permit the individual (selective) applying of drive voltages to the plurality of piezoelectric bodies 1133 to permit each pressure chamber 1131 to be deformed individually as desired for ejections or the like. The individual electrode is part of the wiring pattern formed on the board 111 and the wiring pattern formed on the actuators 113.

A common electrode applies the same drive voltage to all of the plurality of piezoelectric bodies 1133 connected thereto simultaneously. The common electrode is also part of the wiring pattern formed on the board 111 and the wiring pattern formed on the actuator 113.

The individual and common electrodes of the actuator 113 are arranged in the cover 15 and connected to a circuit board on which a driver IC or the like is mounted. For example, the circuit board drives the actuator 113 by applying the drive voltage to the wiring pattern of the actuator 113 from the driver IC and increases or decreases the volume of the pressure chamber 1131 to eject liquid droplets from the nozzles 1141.

As illustrated in FIGS. 3 to 8, the manifold unit 12 includes a manifold 121, a top plate 122, an ink supply pipe 123, an ink discharge pipe 124, a cooling water supply pipe 125, and a cooling water discharge pipe 126. It is noted that the number of ink supply pipes 123, the number of ink discharge pipes 124, the number of cooling water supply pipes 125, and the number of cooling water discharge pipes 126 can be variously set.

The manifold 121 is formed in the plate-like shape or the block-like shape. The manifold 121 includes a supply path 1211 that is continuous with (connected to) the supply port 1111 of the board 111 for forming the liquid supply path, a discharge path 1212 that is continuous with (connected to) a discharge port of the board 111 for forming the liquid discharge path, and the first cooling flow path 1213 for forming the flow path of the cooling fluid. It is noted that since this manifold 121 is connected to a pair of head bodies 11, the manifold 121 has a pair of supply paths 1211 and a pair of discharge paths 1212.

One main surface of manifold 121 is fixed to the main surface of the board 111. The manifold 121 is provided with the top plate 122. The ink supply pipe 123, the ink discharge pipe 124, the first cooling water supply pipe 125, and the first cooling water discharge pipe 126 are fixed to the manifold 121 via the top plate 122.

The manifold 121 includes in this example a first manifold 1214 and a second manifold 1215. The manifold 121 may be formed by assembling the first manifold 1214 and the second manifold 1215 to thereby form the supply path 1211, the discharge path 1212, and the first cooling flow path 1213.

The first manifold 1214 is formed in a rectangular plate shape. For the first manifold 1214, the grooves and the openings are formed to constitute a portion of the pair of supply paths 1211, a portion of the pair of discharge paths 1212, and a portion of the first cooling flow path 1213. The grooves and the openings can be appropriately set in terms of arrangement, size, and the like based on the shapes of the supply path 1211 and the discharge path 1212 and the required/intended shapes of other fluid flow paths.

The first manifold 1214 has a main slit 12141 and a sub slit 12142 connected to the main slit 12141 from the side of the main slit 12141 for the supply path 1211.

The main slit 12141 is a slit-shaped groove penetrating into the manifold in a stacking direction (Z direction) and is connected to the supply port 1111 of the board 111, and is arranged to overlap with an expansion slit 12151 of the second manifold 1215 upon assembly.

The sub slit 12142 is a groove by which a portion of the first manifold 1214 facing the second manifold 1215 is recessed. The sub slit 12142 has a linear portion 12143 parallel to the main slit 12141 and a connection portion 12144 from the linear portion 12143 to a middle portion of the main slit 12141. One end of the linear portion 12143 of the sub slit 12142 is connected to the ink supply pipe 123.

In the first manifold 1214, a pair of cooling grooves 12145 and a pair of openings 12146 are used as openings and grooves forming a portion of the cooling flow path 1213. For example, the cooling grooves 12145 are grooves that are open on the board 111 side. The cooling grooves are on both sides of the main slit 1214, and extend linearly in the same direction as the nozzle column 1142. The cooling openings 12146 are slits penetrating the first manifold 1214 in the thickness direction (Z direction) and connect the ends of cooling grooves 12145 to cooling holes 12154 of the second manifold 1215.

It is noted that in some examples a reinforcing wall that partially covers any of the slits may be provided in the first manifold 1214.

The second manifold 1215 is a rectangular plate shape. With respect to the second manifold 1215, the grooves and the openings form a portion of the pair of supply paths 1211, a portion of the pair of discharge paths 1212, and a portion of the first cooling flow path 1213. The grooves and the openings of the supply path 1211 and the discharge path 1212 may be appropriately set in terms of arrangement, size, and the like based on the shapes of the supply path 1211 and the discharge path 1212 and the shapes of other fluid flow paths.

The second manifold 1215 has linearly extending expansion slits 12151 for forming the supply path 1211. The expansion slit 12151 is a through groove which is at a position overlapping the main slit 12141 but has a width greater than that of the main slit 12141. The expansion slit 12151 communicates with the main slit 12141. Specifically, the expansion slit 12151 expands by a predetermined width toward the side of the opposite side to the sub slit 12142 with respect to the main slit 12141, that is, toward the central side where the pair of actuators face each other. It is noted that a damper 127 can be provided on a ceiling portion of the opening of the second manifold 1215, and the ceiling portion of the supply path 1211 is covered with the damper 127.

In this example, the positions and shapes of some of the holes and the grooves formed inside the second manifold 1215 are illustrated by the flow path shape in FIG. 8.

As illustrated in FIG. 8, the second manifold 1215 is formed with a discharge hole 12153 connected to one end of the expansion slit for forming a portion of the discharge path 1212.

Also as illustrated in FIG. 8, the second manifold 1215 has the cooling holes 12154 (forming a portion of the first cooling flow path 1213) at both longitudinal direction ends. One cooling hole 12154 connects to the ends of a pair of cooling grooves 12145 respectively formed in the pair of first manifolds 1214 and the cooling water supply pipe 125 to form a portion of the first cooling flow path 1213. The other cooling hole 12154 connects to the ends of the pair of cooling grooves 12145 and the cooling water discharge pipe 126 to form the cooling flow path 1213.

The supply path 1211, the discharge path 1212, and the first cooling flow path 1213 are formed in the manifold 121 by the openings, the grooves, and the holes of the first manifold 1214 and the second manifold 1215.

The supply path 1211 fluidly connects the ink supply pipe 123 and the supply port 1111 of the board 111. The supply path 1211 is formed by the main slit 12141 and the sub slit 12142 in the first manifold 1214 and the expansion slit 12151 in the second manifold 1215.

The supply path 1211 passes through a heat generating region (also referred to as a heat generation unit). Specifically, the supply path 1211 passes through or adjacent to the actuators 113.

The supply path 1211 includes the main flow path portion 1216 (first flow path) and the sub flow path portions 1217 (second flow path) connected to the main flow path portion 1216 and arranged in parallel with the main flow path portion 1216.

The main flow path portion 1216 is a parallelepiped liquid chamber extending along the longitudinal direction of the actuator 113 and communicates with the supply port 1111.

The sub flow path portion 1217 extends parallel to the main flow path portion 1216 and also bends at a predetermined location to provide the flow path leading to the confluence position PB (confluence portion) with the main flow path portion 1216. The sub flow path portion 1217 is connected to the supply pipe 123. That is, the liquid from the supply pipe 123 is supplied to the main flow path portion 1216 through the sub flow path portion 1217.

In such a supply path 1211, the liquid flows from the supply position PA, which is the end to which the supply pipe 123 is connected, around the confluence position PB into the main flow path portion 1216. Then, in the main flow path portion 1216, the liquid is supplied from the confluence position PB toward the two end positions PC and PD.

It is noted that the confluence position PB where the sub flow path portion 1217 joins the main flow path portion 1216 is provided in a central region RB excluding approximately 10% of both ends of an effective region RA in the longitudinal direction. For example, the effective region RA is a region in which the nozzles 1141 are arranged, or a region in which the pressure chambers 1131 are arranged. That is, the sub flow path portion 1217 is set in to be in a range less than the full length of than the main flow path portion 1216 along the X direction.

The confluence position PB is arranged to be nearer the opposite end from the supply position PA. That is, the liquid is supplied from the end side where the supply position PA is located into the common liquid chamber 1161 through the main flow path portion 1216 and the supply port 1111 by passing through the middle of the length of the sub flow path portion 1217 and around the confluence position PB on the other end side from the supply port 1111 to then be supplied to the common liquid chamber 1161 and on to each pressure chamber 1131.

In the present example, the pair of head bodies 11 can be assembled alternately from the same member. The pair of head bodies 11 are arranged such that the flow directions of the supply paths 1211 are opposite to each other in the longitudinal direction. That is, in the pair of head bodies 11, the supply positions PA are arranged on the opposite ends in the longitudinal direction, and the confluence positions PB are also arranged on the opposite ends in the longitudinal direction. That is, the liquid flows into the main flow path portion 1216 in one head body 11 from a supply position PA on one end side and through a confluence position PB in the central region RB on the opposite end side, and the liquid flows into the main flow path portion 1216 in of another head body 11, reversely, with a supply position PA on the other end side, through a confluence position PB in the central region RB on the opposite end side.

The discharge path 1212 is a flow path formed in the manifold 121 by holes and/or grooves. The discharge path 1212 is fluidly connected to the ink discharge pipe 124.

The first cooling flow path 1213 is a flow path formed in the manifold 121 by holes or grooves. The first cooling flow path 1213 includes the groove 12145 formed in the manifold 121 facing the board 111, and the groove 12145 is covered by the board 111. The first cooling flow path 1213 fluidly connects the first cooling water supply pipe 125 and the first cooling water discharge pipe 126 and is used to cool the head body 11.

In the present example, one first cooling flow path 1213 is provided for each actuator 113. In this example, the first cooling flow path 1213 is formed on the outer side portion of the board 111 opposite to the central side where the supply port 1111 is formed and extends along the longitudinal direction of the actuator 113. The first cooling flow path 1213 fluidly connects the cooling water supply pipe 125 and the cooling water discharge pipe 126.

The opposite ends of the first cooling flow path 1213 are connected to the first cooling water supply pipe 125 and the first cooling water discharge pipe 126. The first cooling flow path 1213 is formed to provide heat exchange with the board 111 fixed to the manifold 121.

The top plate 122 is provided on the surface of the manifold 121. The top plate 122 has an opening allowing the ink supply pipe 123, the ink discharge pipe 124, the first cooling water supply pipe 125, and the first cooling water discharge pipe 126 to communicate with the supply path 1211, the discharge path 1212, and the first cooling flow path 1213.

In this example, the top plate 122 is formed by two plate-like members. One of the ink supply pipe 123 and the ink discharge pipe 124 and one of the first cooling water supply pipe 125 and the first cooling water discharge pipe 126 are provided on each of the plate-like members.

The ink supply pipe 123 is connected to the supply path 1211. The ink discharge pipe 124 is connected to the discharge path 1212. In the present embodiment, the liquid ejection head 1 includes a pair of head bodies 11, and thus, a pair of ink supply pipes 123 and ink discharge pipes 124 are correspondingly provided. The first cooling water supply pipe 125 and the first cooling water discharge pipe 126 are respectively connected to the primary side and secondary side of the first cooling flow path 1213.

A damper 127 is formed of an elastically deformable thin film or sheet. As illustrated in FIG. 6, the damper 127 covers the ceiling portion of the supply path 1211 formed in the second manifold 1215. The damper 127 elastically deforms according to pressure fluctuations in the supply path 1211. One surface of the damper 127 faces the supply path 1211.

As a specific example, the damper 127 can be formed of a polyimide film. The damper 127 is formed in a rectangular shape elongated in the same direction as the longitudinal direction (first direction X) of the opening of the ceiling portion of the supply path 1211 elongated in the one direction (first direction X).

The cover 15 includes, for example, an outer shell 151 covering the side surfaces of the pair of head bodies 11 and the manifold unit 12 and a mask plate covering a portion of the pair of head bodies 11 on the nozzle plate 114 side.

The outer shell 151 exposes, for example, the ink supply pipe 123, the ink discharge pipe 124, the cooling water supply pipe 125, and the cooling water discharge pipe 126 of the manifold unit 12 to the outside.

The mask plate covers the pair of head bodies 11 except for the plurality of nozzles 1141 and a portion adjacent the plurality of nozzles 1141.

The liquid ejection head 1 includes a common electrode 119 and individual electrodes 118 for each of the piezoelectric bodies 1133 for applying the driving voltage to each of the piezoelectric bodies 1133 in the head body 11.

For this reason, the liquid ejection head 1 can selectively drive the pressure chambers 1131 individually or together. When the pressure chamber 1131 is driven, the pressure chamber 1131 is deformed in a shear mode, and the ink supplied into the pressure chamber 1131 is compressed. Therefore, the liquid ejection head 1 can selectively eject the ink from the nozzles 1141 corresponding to the pressure chambers 1131.

The common electrode 119 is also formed on the front surface 115, the inclined surface 1134, the inner surface of the air chamber 1132, and the inner peripheral surface of the supply port 1111 in the board 111.

The liquid ejection head 1 cools the head body 11 (liquid ejection portion) with the manifold unit 12. Cooling water supplied from the second cooling water supply pipe 133 is discharged from the second cooling water discharge pipe 134 through the first cooling flow path 1213. The cooling water flowing through the first cooling flow path 1213 cools the head body 11.

A liquid ejection device 2 incorporating a liquid ejecting head 1 will be described with reference to FIG. 11. The liquid ejection device 2 includes a housing 2111, a medium supply unit 2112, an image forming unit 2113, a medium discharge unit 2114, a conveying device 2115 as a support device, a maintenance device 2117, and a control unit 2118. The liquid ejection device 2 also includes the cooling device adjusting the temperature of ink supplied to the liquid ejection head 1.

The liquid ejection device 2 in this example is an inkjet printer performing an image forming process on a paper P which is conveyed along a conveyance path 2001 from the medium supply unit 2112 to the medium discharge unit 2114 through the image forming unit 2113.

The medium supply unit 2112 has a plurality of paper feed cassettes 21121. The image forming unit 2113 includes a support unit 2120 supporting the sheet and a plurality of head units 2130 arranged above the support unit 2120. The medium discharge unit 2114 includes a paper discharge tray 21141.

The support unit 2120 includes a conveying belt 21201 provided in a loop shape in an area for performing the image formation, a support plate 21202 supporting the conveying belt 21201 from the back side, and a plurality of belt rollers 21203 provided on the back side of the conveying belt 21201.

The head unit 2130 includes the liquid ejection heads 1 (inkjet heads), supply tanks 2132 mounted on each of the liquid ejection heads 1, a pump 2134 for supplying ink, and a connection flow path 2135 connecting each liquid ejection head 1 to a corresponding supply tank 2132.

In the present embodiment, the head unit 2130 includes the four liquid ejection heads 1 one for each of cyan, magenta, yellow, and black along with four supply tanks 2132 containing ink of the respective colors. Each supply tank 2132 is connected to the liquid ejection head 1 by a connection flow path 2135.

The pump 2134 is, for example, a liquid feed pump configured with a piezoelectric pump. The pump 2134 is connected to the control unit 2118 and controlled/driven by the control unit 2118.

The connection flow path 2135 provides the supply flow path that is connected to the ink supply pipe 123 of a liquid ejection head 1. The connection flow path 2135 also includes a recovery flow path connected to the ink discharge pipe 124 of the liquid ejection head 1. For example, if the liquid ejection head 1 is of a non-circulating type, a recovery circuit may be connected to the maintenance device 2117. If the liquid ejection head 1 is of a circulating type, the recovery flow path is connected to the supply tank 2132 for a return flow.

The conveying device 2115 conveys the paper P along the conveyance path 2001 from the paper feed cassette 21121 of the medium supply unit 2112 to the paper discharge tray 21141 of the medium discharge unit 2114 through the image forming unit 2113. The conveying device 2115 includes a plurality of guide plate pairs 21211 to 21218 arranged along the conveyance path 2001 and a plurality of conveying rollers 21221 to 21228. The conveying device 2115 supports the paper P to be movable relative to the liquid ejection heads 1.

The cooling device 2116 has a cooling water tank 21161, a cooling circuit 21162 (comprising pipes and tubes and the like) supplying cooling water, a pump for supplying the cooling water, a cooler for adjusting/maintaining temperature of the cooling water, and the like. The cooling device 2116 supplies the cooling water from the cooling water tank 21161 (after the temperature has been adjusted to a predetermined temperature by the cooler) to the second cooling water supply pipe 133 through the cooling circuit 21162 by the pump sending the water. The cooling device 2116 recovers the water discharged from the second cooling water discharge pipe 134 after flowing through the first cooling flow path 1213 and the second cooling flow path 1312 to the cooling water tank 21161 through the cooling circuit 21162. It is noted that the cooler is, for example, a chiller or a heat exchanger.

The maintenance device 2117, for example, suctions and recovers ink remaining on the outer surface of the nozzle plate 114 during the maintenance. If the liquid ejection head 1 is of a non-circulating type, the maintenance device 2117 recovers the ink from inside the head body 11 during a maintenance operation. Such a maintenance device 2117 may include a tray, a tank, or the like for storing the recovered ink.

The control unit 2118 includes a CPU 21181 as an example of a processor, a read only memory (ROM) for storing various programs, a random access memory (RAM) for temporarily storing various variable data and image data, and an interface unit for receiving data from the outside and outputting data to the outside.

According to the liquid ejection head 1 and the liquid ejection device 2, a cooling effect can be improved by providing a plurality of flow paths passing through a heat generation region such as the actuators 113. In the present embodiment, the supply path 1211 of the manifold 121 is arranged to pass through the heat generation region in which the actuator 113 is disposed, so that the heat from the actuator 113 can be rapidly transferred. In addition, the confluence position PB of the main flow path portion 1216 and the sub flow path portion 1217 is provided in the central region RB, so that the cooling effect can be further improved. In the configuration where the supply position PA and the confluence position PB of the sub flow path portion 1217 are arranged on opposite ends of the main flow path portion 1216, when the liquid is ejected, the occurrence of temperature differences along the column direction can be suppressed, and good print quality can be maintained.

In the present example, a pair of head bodies 11 are assembled so that the flow paths will be in opposite flow directions, and in one head body 11, through the confluence position in the region from one end to the other end, and on the other hand, in the other head body 11, through the confluence position in the region from the other end to one end, the liquid flows into the main flow path portion 1216. FIG. 9 is a graph illustrating the heat distribution in the liquid ejection head 1 according to the first embodiment, and FIG. 10 is a graph illustrating the heat distribution in a liquid ejection head (Comparative Example) that does not have the sub flow path portion. FIGS. 9 and 10 illustrate results of measurement of temperatures at ten equally spaced locations along the longitudinal direction of two columns of four nozzle columns 1142 of one end column 11421 and the two other end columns 11422 in the Y direction.

The liquid ejection head according to Comparative Example has just a single supply path passing through the center of the pair of actuators. In FIGS. 9 and 10, the horizontal axis indicates the position along the nozzle column direction, and the vertical axis indicates the temperature of the actuators 113 of the pair of head bodies. In FIG. 9, the liquid ejection head 1 has a sub flow path portion 1217, and thus, the heat distribution across the actuators 113 is made uniform, and the temperature of each portion can be maintained appropriately low. For this reason, well-balanced printing performance can be obtained.

In FIG. 10 (Comparative Example without a sub flow path portion 1217), heat is transferred from the ink supply side to the ink discharge side, and the heat balance between the high temperature side and the low temperature side crosses as some point. If the liquid is ejected in this state, the printing accuracy of the plurality of columns will not be uniform, which may cause printing defects.

On the other hand, in the configuration of the present embodiment, the supply path 1211 of the manifold 12 is arranged to pass through the heat generation portion region and can rapidly transfer the heat from the vicinity of the driving heat generation portion of the actuator 113.

When the confluence position PB is at an actual end of the main flow path portion 1216, the pressure loss is increased, so that the resistance is increased, and the ejection balance will not be uniform. If the confluence position PB is at the center point of the main flow path portion 1216, the cooling effect will be lowered. On the other hand, with confluence position PB arranged to be on the opposite side of the supply position PA past the center but in the central region RB (which excludes 10% of from ends of the effective region RA), fluid resistance is suppressed, but appropriate flow path length can still be secured. Therefore, the ink supplied at room temperature (or at a relatively low temperature) can be heated to the appropriate temperature within the range of the cooling flow path provided in the manifold. Therefore, the arrangement is such that stable ink ejection can be implemented.

In an embodiment, an expansion slit 12151 having a large width is formed, so that a capacity of the common liquid chamber can be ensured.

It is noted that the embodiments of the present disclosure are not limited to the specific configurations described above.

For example, although an example where the supply port 1111, which is an elongated hole, is arranged between the pair of actuators 113 was described, the present disclosure is not limited thereto, and the shape, number, and arrangement of the supply ports 1111 can be appropriately set. In addition, the discharge port may be provided at any other location of the board 111.

For example, although an example where the main flow path has one sub flow path that flows in parallel in the side portion on the opposite side of the supply hole was described, the present disclosure is not limited thereto. A configuration may be used in which the pair of sub flow paths are arranged on both side portions of one main flow path. In addition, the pair of sub flow paths can be arranged such that the supply position and the confluence position are on the opposite sides in the nozzle column direction.

In an example, the manifold 12 is configured with the separate first manifold 1214 and second manifold 1215, the present disclosure is not limited thereto, and these components may be integrated as one member. In addition, although an example where the width of the flow path of the second manifold 1215 is expanded for the main flow path portion 1216 was described, the width variation is not limited thereto, and in other examples the width may be constant.

In an example, the liquid ejection head 1 is provided with the pair of head bodies 11, the present disclosure is not limited thereto, and a single head body 11 may be used. In addition, although a configuration in which the head body 11 is provided with the pair of actuators 113 is described, the present disclosure is not limited thereto. For example, a configuration where the head body 11 has one actuator 113 may be used. In an example, the liquid ejection head 1 is of a non-circulating type, but the liquid ejection head 1 may be of a circulating type in other examples.

In an example, the inkjet head has one side of the pressure chamber 1131 as the supply side, the other side as the discharge side, and ink flows in from one side of the pressure chamber 1131 and flows out from the other side, but the present disclosure is not limited thereto. For example, a design in which common liquid chambers on both sides of the pressure chamber 1131 may function as the supply side such that ink flows in from both sides may be adopted. In addition, the supply side and the discharge side may be reversed or may be configured to be switchable in some examples.

In an example, a side shooter type inkjet head is described, but the present disclosure is not limited thereto and an end shooter type inkjet head may be adopted.

The liquid to be ejected is not limited to ink for printing, and the liquid to be ejected may be a liquid containing conductive particles for forming a wiring pattern of a printed wiring board or the like.

An inkjet printer is described as an example, but the present disclosure is not limited thereto and a liquid ejection head according to an embodiment can also be used in, for example, 3D printers, industrial manufacturing machines, and medical applications.

According to at least one embodiment described above, since the common electrode is formed on the end face of the board, high print quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:

a nozzle plate including a plurality of nozzles arranged in a row along a first direction;

an actuator including a plurality of pressure chambers, each pressure chamber being associated with a respective nozzle of the nozzle plate, the pressure chambers extending lengthwise in a second direction intersecting the first direction;

a first common chamber on a first side of the plurality of pressure chambers and extending lengthwise along the first direction;

a second common chamber on a second side of the plurality of pressure chambers and extending lengthwise along the first direction, the plurality of pressure chambers being between the first and second common chambers in the second direction; and a manifold on a surface of the actuator and forming a first liquid flow path above the first common chamber in a third direction and extending lengthwise along the first direction, a first cooling flow path above the second common chamber in the third direction and extending lengthwise along the first direction, and a second liquid flow path above the first cooling flow path in the third direction and extending lengthwise in the first direction, the second liquid flow path being connected to the first liquid flow path by a confluence portion at a confluence position between a first end of the first liquid flow path in the first direction and a midpoint of the first liquid flow path along the first direction.

2. The liquid ejection head according to claim 1, wherein the confluence position is at least 10% of a total length of the row of the plurality of nozzles from the first end of the first liquid flow path.

3. The liquid ejection head according to claim 1, wherein an inlet supply position for liquid to the second liquid flow path is at an opposite end of the second liquid flow path from the confluence portion.

4. The liquid ejection head according to claim 1, wherein the manifold includes a first plate portion including the first cooling flow path therein and a second plate portion including the second liquid flow path therein.

5. The liquid ejection head according to claim 4, wherein the first liquid flow path includes portions in the first plate portion and the second plate portion.

6. The liquid ejection head according to claim 5, wherein the first liquid flow path has a first width in the second direction in the first plate portion and a second width in the second direction in the second plate portion, and the first width is less than the second width.

7. The liquid ejection head according to claim 4, wherein the first cooling flow path comprises a groove in a surface of the first plate portion facing the actuator.

8. The liquid ejection head according to claim 4, wherein the first liquid flow path comprises a slit in the first plate portion and a slit in the second plate portion.

9. A liquid ejection head, comprising:

a first head body;

a nozzle plate including a plurality of nozzles arranged in two rows along a first direction, the two rows being spaced from each other in a second direction;

a first actuator on the first head body and including a first plurality of pressure chambers, each pressure chamber of the first plurality of pressure chambers being associated with a respective nozzle of the nozzle plate in a first row, the pressure chambers of the first plurality extending lengthwise in the second direction;

a second actuator on the first head body and including a second plurality of pressure chambers, each pressure chamber of the second plurality of pressure chambers being associated with a respective nozzle of the nozzle plate in a second row, the pressure chambers of the second plurality extending lengthwise in the second direction;

a first common chamber on a first side of the first plurality of pressure chambers and extending lengthwise along the first direction, the first common chamber being between the first and second actuators in the second direction;

a second common chamber on a second side of the first plurality of pressure chambers and extending lengthwise along the first direction, the first plurality of pressure chambers being between the first and second common chambers in the second direction; and a manifold on a surface of the first head body and forming a first liquid flow path above the first common chamber in a third direction and extending lengthwise along the first direction, a first cooling flow path above the second common chamber in the third direction and extending lengthwise along the first direction, and a second liquid flow path above the first cooling flow path in the third direction and extending lengthwise in the first direction, the second liquid flow path being connected to the first liquid flow path by a confluence portion at a confluence position between a first end of the first liquid flow path in the first direction and a midpoint of the first liquid flow path along the first direction.

10. The liquid ejection head according to claim 9, wherein the confluence position is at least 10% of a total length of the first row of the plurality of nozzles from the first end of the first liquid flow path.

11. The liquid ejection head according to claim 9, wherein an inlet supply position for liquid to the second liquid flow path is at an opposite end of the second liquid flow path from the confluence portion.

12. The liquid ejection head according to claim 9, wherein the manifold includes a first plate portion including the first cooling flow path therein and a second plate portion including the second liquid flow path therein.

13. The liquid ejection head according to claim 12, wherein the first liquid flow path includes portions in the first plate portion and the second plate portion.

14. The liquid ejection head according to claim 13, wherein the first liquid flow path has a first width in the second direction in the first plate portion and a second width in the second direction in the second plate portion, and the first width is less than the second width.

15. The liquid ejection head according to claim 13, wherein the first cooling flow path comprises a groove in a surface of the first plate portion facing the actuator.

16. The liquid ejection head according to claim 9, further comprising:

a second head body;

a second nozzle plate including a plurality of nozzles arranged in two rows along the first direction, the two rows being spaced from each other in the second direction;

a third actuator on the second head body and including a third plurality of pressure chambers, each pressure chamber of the third plurality of pressure chambers being associated with a respective nozzle of the second nozzle plate in a first row, the pressure chambers of the third plurality extending lengthwise in the second direction;

a fourth actuator on the second head body and including a fourth plurality of pressure chambers, each pressure chamber of the fourth plurality of pressure chambers being associated with a respective nozzle of the second nozzle plate in a second row, the pressure chambers of the fourth plurality extending lengthwise in the second direction;

a third common chamber on a first side of the third plurality of pressure chambers and extending lengthwise along the first direction, the third common chamber being between the third and fourth actuators in the second direction; and a fourth common chamber on a second side of the third plurality of pressure chambers and extending lengthwise along the first direction, the third plurality of pressure chambers being between the third and fourth common chambers in the second direction, wherein the manifold has a third liquid flow path above the third common chamber in the third direction and extending lengthwise along the first direction, a second cooling flow path above the fourth common chamber in the third direction and extending lengthwise along the first direction, and a fourth liquid flow path above the second cooling flow path in the third direction and extending lengthwise in the first direction, the fourth liquid flow path being connected to the third liquid flow path by a second confluence portion at a second confluence position between a first end of the third liquid flow path in the first direction and a midpoint of the third liquid flow path along the first direction.

17. The liquid ejection head according to claim 16, wherein the second confluence position is at least 10% of a total length of the first row of the plurality of nozzles from the first end of the third liquid flow path.

18. The liquid ejection head according to claim 16, wherein an inlet supply position for liquid to the third liquid flow path is at an opposite end of the fourth liquid flow path from the second confluence portion.

19. An image forming apparatus, comprising:

a liquid supply tank; and a liquid ejection head connected to the liquid supply tank, the liquid ejection head including:

a nozzle plate including a plurality of nozzles arranged in a row along a first direction;

an actuator including a plurality of pressure chambers, each pressure chamber being associated with a respective nozzle of the nozzle plate, the pressure chambers extending lengthwise in a second direction intersecting the first direction;

a first common chamber on a first side of the plurality of pressure chambers and extending lengthwise along the first direction;

a second common chamber on a second side of the plurality of pressure chambers and extending lengthwise along the first direction, the plurality of pressure chambers being between the first and second common chambers in the second direction; and a manifold on a surface of the actuator and forming a first liquid flow path above the first common chamber in a third direction and extending lengthwise along the first direction, a first cooling flow path above the second common chamber in the third direction and extending lengthwise along the first direction, and a second liquid flow path above the first cooling flow path in the third direction and extending lengthwise in the first direction, the second liquid flow path being connected to the first liquid flow path by a confluence portion at a confluence position between a first end of the first liquid flow path in the first direction and a midpoint of the first liquid flow path along the first direction.

20. The image forming apparatus according to claim 19, wherein the confluence position is at least 10% of a total length of the row of the plurality of nozzles from the first end of the first liquid flow path.

21. The image forming apparatus according to claim 19, wherein an inlet supply position for liquid to the second liquid flow path is at an opposite end of the second liquid flow path from the confluence portion.

* * * * *